United States Patent [19]

Fields

[11] Patent Number: 4,525,399

[45] Date of Patent: Jun. 25, 1985

[54] PERFORATED REINFORCING STRIP FOR USE WITH CONTINUOUS FORMS

[76] Inventor: Robert J. Fields, 2811 Adeline Dr., Burlingame, Calif. 94010

[21] Appl. No.: 501,509

[22] Filed: Jun. 6, 1983

[51] Int. Cl.[3] .................................................. B32B 3/24

[52] U.S. Cl. ...................................... 428/43; 428/131; 428/137; 428/192; 428/343; 24/67 R

[58] Field of Search ................. 428/43, 131, 137, 343, 428/192; 24/67 R

[56] References Cited

U.S. PATENT DOCUMENTS 2,764,501 9/1956 Perri ................................ 428/343 X

*Primary Examiner*—Alexander S. Thomas

*Attorney, Agent, or Firm*—Henderson & Sturm

[57] ABSTRACT

A manufactured article for reinforcing continuous forms having sprocket holes comprising a means for reinforcing the sprocket holes and alternatively additionally comprises means for reinforcing perforations found in said continuous forms. Said article comprises a continuous pliable strip having self-adhesive disposed on one side thereof and having a row of holes disposed therein with uniform spacing therebetween. The strip additionally has perforations which are transverse to the longitudinal axis of the strip and are disposed between alternative holes of the strip. The article may additionally comprise reinforcing tabs projecting from one edge of the strip to provide supplemental reinforcing means to the article.

3 Claims, 3 Drawing Figures

PERFORATED REINFORCING STRIP FOR USE WITH CONTINUOUS FORMS

BACKGROUND OF THE INVENTION

1. Field of Invention

This invention relates to a manufactured article for reinforcing continuous forms having sprocket holes, specifically, those forms intended for use in computer printers. The article comprises a means for reinforcing the sprocket holes found in said forms for cooperatively engaging the drive tractors of the printer. Additionally, the article reinforces the perforations separating the continuous forms.

2. Description of the Prior Art

The article disclosed herein provides a novel means for reinforcing continuous forms intended for use in computer printers. Said forms are generally rectangular in shape having two rows of sprocket holes disposed along and in close proximity to opposite edges of the form, said holes being designed to cooperatively engage the pins of the drive tractors of the typical computer printer.

Said sprocket holes are additionally utilized for binding the continuous forms after they are printed. Binding posts are passed through the sprocket holes disposed in adjacent corners of a stack of forms so printed. This method of binding and storing the forms often results in tearing of one or more of the forms from the post rendering this prior art method of binding inadequate for repeated use of the stack for information retrieval.

The article disclosed herein provides the means for selectively reinforcing any or all of the sprocket holes generally found in pre-printed computer forms.

Additionally, where the continuous forms have strips defining the sprocket holes, which are removeably separable from the forms by means of perforations, an alternative embodiment of the article provides tabs for reinforcing said perforations.

SUMMARY OF THE INVENTION

There is provided in the practice of the invention according to a presently preferred embodiment, a manufactured article for reinforcing pin-feed forms intended for computer printers. Said article comprises a self-adhesive, continuous, pliable strip having a row of holes disposed therein with uniform spacing therebetween, said strip having perforations which are transverse to the longitudinal axis of the strip and are disposed between alternate holes of the strip. The article may additionally comprise reinforcing tabs projecting from one edge of the strip to provide supplemental reinforcing means to the article.

BRIEF DESCRIPTION OF THE DRAWINGS

These and other features and advantages of the present invention will be better understood by reference to the following detailed description when considered in connection with the accompanying drawings wherein.

DESCRIPTION OF THE PREFERRED EMBODIMENTS

Figure 1:
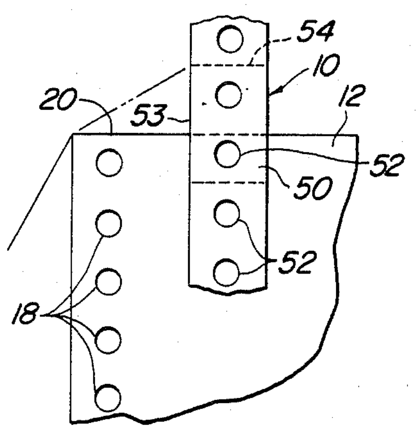
FIG. 1 illustrates a plan view of the article shown in conjunction with a pin-feed form constructed according to the principles of this invention.

FIG. 1 shows the preferred embodiment of the article 10 constructed according to the principles of the invention. A portion of the continuous form 12 is shown having a plurality of sprocket holes 18 disposed along one edge of the form 12. Said holes 18 are spaced apart on uniform centers according to computer industry standards for pin-feed products. Said spacing is selected to cooperatively engage the pins of a tractor of a typical computer printer (not shown). The leading edge or top of the form 20 is also shown. Each form is separated from its adjacent form by tearing along perforations running along the leading edge 20 of each form 12.

Subsequent to printing, the forms 12 may be separated along said perforations in a process known as "bursting". Alternatively, the forms 12 may be bound by folding the forms along said perforations at the forms leading edge 20 to generate a stack having a width and length equal to the width and length of a single form 12, the height of the stack being determined by the number of forms included in the stack.

Posts (not shown) are removeably passed through the holes 18 disposed in opposite corners of the form 12 and closest to the leading edge 20 of the stacked forms. Said posts provide the means for binding the stack of forms so that they cannot be inadvertantly unfolded along the perforations at their leading edges 20.

The article 10 is comprised of a continuous pliable strip 50 having sprocket holes 52 disposed therein. Said holes 52 are circular and are disposed within the strip 50 on centers equal in distance to those for the sprocket holes 18 of the continuous form 12.

Disposed on one side of the strip is a self-adhesive material (not shown). Said material is preferably selected from any of the group of pressure sensitive adhesives currently utilized by the adhesive tape industry for bonding with paper products.

The width of the strip 50 is approximately ½ inch in the preferred embodiment. The sprocket holes 52 are spaced apart from the edge 53 at a distance equal to that of the sprocket holes 18 from the proximal edge of the form 12. This arrangement results in the holes 52 being approximately centered within the strip 50. Perforations 54 are disposed within the strip 50 between alternating holes 52. Said perforations are transversly disposed with respect to the longitudinal axis of the strip 50.

Figure 2:
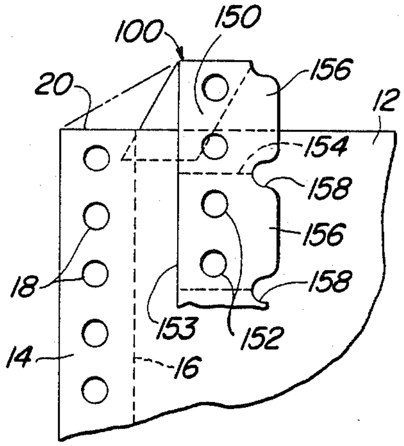
FIG. 2 is an alternative embodiment of the article.

FIG. 2 shows an alternative embodiment which facilitates reinforcement of computer forms 12 having an additional longitudinal perforations 16 for selectively removing a strip 14 containing the sprocket holes 18 from said form 12.

The article 100 is comprised of continuous pliable strip 150 having sprocket holes 152 disposed therein. Said holes 152 are circular and are disposed within the strip on 150 on centers equal in distance to those of the sprocket holes 18 of the continuous form 12.

Disposed on one side of the strip is a self-adhesive material (not shown). Said material is preferably selected from any of the group of pressure sensitive adhesives currently utilized by the adhesive tape industry for bonding with paper products.

The sprocket holes 152 are spaced apart from the edge 153 at a distance equal to that of the sprocket holes 18 from the proximal edge of the form 12. Perforations 154 are disposed within this strip 150 between alternating holes 152. Said perforations are transversly disposed with respect to the longitudinal axis of the strip 150.

Said article 100 additionally comprises plurality of tabs 156 projecting from the edge of the strip opposite that edge 153 intended to be aligned with the edge of the form 12. Said tabs 156 are separated and defined by semi-circular reliefs 158. Said reliefs 158 are disposed between alternating holes 152. Transverse perforations 154 intersect each of the reliefs 158. Said tabs 156 result in the strip 150 having a width greater than the strip 14 of the form.

Figure 3:
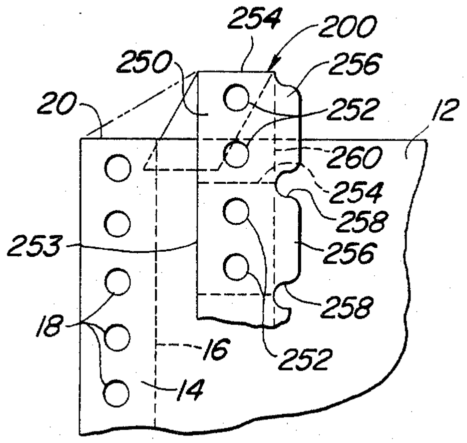
FIG. 3 is a second alternative embodiment of the article constructed according to the principles of this invention.

FIG. 3 shows a second alternative embodiment which facilitates reinforcement of computer forms 12 having additional longitudinal perforations 16 for selectively removing a strip 14 containing the sprocket holes 18 from said form 12.

The article 200 in this second alternative embodiment is comprised of a strip 250 manufactured as described above for the first alternative embodiment. Said article 200 additionally comprises perforations 260 which are disposed parallel to the longitudinal axis of the strip 250. Said perforations 260 are disposed within the strip 250 such that the distance from the perforations to the distal edge of the strip 253 is equal to the distance between the perforation 16 of form 12 and the closest edge of the form. The reliefs 258 tangentially contact the longitudinal perforations 260.

The embodiments shown in FIGS. 1, 2, and 3 are preferably manufactured from paper, cloth-reinforced paper, or plastic such as mylar. Said embodiments may be transparent or opaque and be selected from any of a number of colors to assist in the immediate identification of certain documents.

The user has two alternative methods of utilizing the preferred embodiment 10. In the first method, a portion of the strip 50 is removed containing two adjacent holes 50. Said portion is removed by tearing along selected transverse perforations 54. The portion of the strip 50 thus provided is folded over the leading edge 20 defining the perforations along which the forms 12 are folded. Proper utilization of the article 10 results in the edge 53 of the strip 50 being aligned with the desired edge of the form 12. Additionally, the two holes 52 with the top hole 18 of the form 12 as well as the bottom hole (not shown) of the adjacent form.

This arrangement not only reinforces the holes 18 of the form through which the post may pass for binding the forms, but additionally reinforces the perforations along which the forms are folded.

In the alternative method of utilizing the preferred embodiment of the article 10, a portion of the strip 50 is torn off along transverse perforations 54 such that the resulting portion has four adjacent holes 52 having unseparated transverse perforation 54 disposed between the second and third hole of the portion of the strip being utilized. In this method, the user applies the portion of the strip such that the perforations 54 disposed in the middle of the portion are aligned with the perforations at the edge 20 along which the forms 12 are folded.

Additionally, the edge of the strip 50 is aligned with the desired edge of the form 12. Finally, the holes 52 are aligned with the top two holes of the form 12 and the bottom two holes of the adjacent form.

This method of utilization reinforces the holes 18 through which the post passes as well as providing a degree of reinforcement for the perforations along which the forms 12 are folded. The advantage to this method is that the user may conveniently separate the forms 12 along the perforations at the leading edge 20 because the portion of the article 10 applied for reinforcement can easily be separated along the transverse perforation 54 which is part of said portion.

The first alternative embodiment 100 is intended for use with computer forms 12 having rows of perforations 16 running parallel to the rows of sprocket holes 18 and in close proximity thereto for conveniently and selectively removing the strip 14 containing said holes. This embodiment provides two alternative methods for use.

In the first method the user tears along the transverse perforations 154 a portion of the strip 150 containing two holes 152. Said portion is applied to the forms by folding it over the perforations along which the forms 12 are folded. The edge 153 of the portion of the strip 150 so applied is aligned with the desired edge of the form. Additionally, the holes 152 are aligned with the top hole 18 of the form and the bottom hole of the adjacent form.

In the second method of utilizing the alternative embodiment of the article 100, a portion of the strip 150 is torn along transverse perforations 154 such that the resulting portion has four adjacent holes 152 having unseparated transverse perforations 154 disposed between the second and third hole of the portion of the strip being utilized. In this method, the user applies the portion of the strip 150 such that the unseparated perforations 154 disposed in the middle of the portion are aligned with the perforations at the top edge 20 along which the forms are folded.

Additionally, the edge of the strip 150 is aligned with the desired edge of the form 12. Finally the holes 152 are aligned with top two holes of the form 12 and the bottom two holes of the adjacent form. This method of utilization reinforces holes 18 through which the post passes as well as providing a degree of reinforcement for the perforations along which the forms 12 are folded.

The second alternative embodiment of the article 200 is intended to be used in conjunction with forms 12 having optional perforations 16 parallel to the rows of sprocket holes 18 for providing reinforcement of said perforations by means of the tabs 156. Said reinforcement minimizes tearing of the forms along the perforations 16 as well as reinforces the holes 18 through which the binding posts pass.

The second alternative embodiment of the article 200 has two alternative methods of use which are similar to those described above for the previous alternative embodiment. The longitudinal perforations 260 provide a means for the user to selectively remove the strip 14 from a form 12 after the reinforcing strip 250 has been applied to the form. Prior to such removal along said perforations, the article 200 provides reinforcement of the longitudinal 16 perforations of the form in addition to that reinforcement described above for the previous alternative embodiment.

Any of the three embodiments of the article described herein can be conveniently supplied in rolls similar to rolls of commercially available pressure sensitive adhesive tape. Thus, the adhesive side of the strip is removably placed in contact with the adjacent, non-adhesive side of the strip in a continuous spiral which may contain several yards of the article. Alternatively, the article can be supplied removeably self-adhered to a wax or plastic coated backing strip of greater or equal width to that of the article 10. In this configuration, the article 10 may be easily removed from the backing strip by the user.

Both configurations can be conveniently provided in spiral rolls which are contained within cardboard or plastic dispensers through which one end of the roll emerges. An edge of the dispenser is conveniently provided as a means for tearing a portion of the article from the supply roll preferrably at the transverse perforations 54.

The described embodiments of the invention are only considered to be preferred and illustrative of the invent of concept. The scope of the invention is not restricted to such embodiments. Various numerous other arrangements may be described by one skilled in the art without departing from the spirit of the scope of this invention.

I claim:

1. A manufactured article for reinforcing continuous pin-feed forms intended for computer printers comprising a continuous, pliable strip having disposed on one side of said strip a self-adhesive material additionally having a row of holes disposed therein with uniform spacing therebetween, said strip having perforations transverse to the longitudinal axis of the strip and said perforations being disposed between alternative holes of the strip, said strip additionally comprising a plurality of tabs disposed along one edge of the strip said tabs being defined in part by perforations which are disposed within the strip and parallel to the longitudinal axis of the strip.

2. The article of claim 1 wherein the adhesive is pressure sensitive.

3. The article in claim 1 wherein the pliable strip is manufactured from materials selected from the group consisting of paper, cloth-reinforced paper and plastic.

* * * * *